March 19, 1963 E. E. WARNICK ET AL 3,082,407

DEVICE FOR TRANSFERRING DIGITAL DATA FROM A MEDIUM TO A RECORDING DEVICE

Filed April 19, 1961

4 Sheets-Sheet 1

Edward E. Warnick
Rudolf van den Berge
INVENTORS

BY R. Frank Smith
Lloyd F. Seebach
ATTORNEY & AGENT

Edward E. Warnick
Rudolf van den Berge
INVENTORS
BY R. Frank Smith
Lloyd F. Seebach
ATTORNEY & AGENT Edward E. Warnick
Rudolf van den Berge
INVENTORS BY R. Frank Smith
Lloyd F. Seebach
ATTORNEY & AGENT

DEVICE FOR TRANSFERRING DIGITAL DATA FROM A MEDIUM TO A RECORDING DEVICE

Filed April 19, 1961 4 Sheets-Sheet 4

Edward E. Warnick
Rudolf van den Berge
INVENTORS

BY R. Frank Smith
Lloyd F. Seebach
ATTORNEY & AGENT

United States Patent Office 3,082,407
Patented Mar. 19, 1963

3,082,407

DEVICE FOR TRANSFERRING DIGITAL DATA FROM A MEDIUM TO A RECORDING DEVICE

Edward E. Warnick and Rudolf van den Berge, Rochester, N.Y., assignors to Eastman Kodak Company, Rochester, N.Y., a corporation of New Jersey Filed Apr. 19, 1961, Ser. No. 104,102
10 Claims. (Cl. 340—172.5)

The present invention relates to circuit means for transforming output signals in character form to output signals in word form and more specifically to a character serial-to-word serial converter.

In U.S. Patent 2,881,658 a photographic recording device is disclosed for making film records which contain only coded information (digital data) or both coded information and micro images of original documents (graphical data). U.S. Patent 2,903,941 discloses an indicia recording device for use in conjunction with the aforementioned recording device. In this latter patent, the light pattern corresponding to each column of code on the tape is set up with the reading or sensing of each column, the complete pattern being exposed after the last column of a word has been sensed. The direct operation of the indicia recording device from the tape does not prevent recording, if the required number of characters is not read nor does it present any way by which information can be derived from more than one tape so as to incorporate information from such tapes in the recording device by switching from one tape reader to another.

The disclosed embodiment of the invention described hereinbelow accepts, for example, eight code bits in parallel comprising six data code bits, one parity code bit and one sprocket or timing pulse for seven successive (serial) groups from the tape reader, the seven groups constituting one word of information. The word is stored in a shift register and read out in parallel upon receipt of a control character from the tape reader. Circuitry is provided for generating word parity by storing and summing binarily the tape character parity signals. In addition, the sequential control of the photographic recording device referred to above is obtained by the signals derived from control characters and coded on the tape in predetermined relation to a coded character or word. The circuitry also provides for display of numerics upon reading or sensing of a particular code character associated with the numerics of a word.

The primary object of the invention is, therefore, to provide a device for storing a number of characters serially and reading out said characters in parallel.

Another object of the invention is to provide circuit means responsive to successive groups of signals for storing said signals until said groups are released simultaneously in accordance with the receipt of a predetermined number of such groups of signals.

Yet another object of the invention is to provide circuit means responsive to the signals derived from a particular code character on one information-bearing medium for switching to another information-bearing medium so as to record the information on said mediums in a manner as determined by such particular code character.

Still another object of the invention is to provide circuit means responsive to the signals derived from particular characters on an information-bearing medium for controlling the sequential operation of a recording device.

And a further object of the invention is to provide circuit means responsive to the signals derived from a particular character for displaying the numeric word associated with said character.

These and other objects will be apparent to those skilled in the art by the description of one embodiment of the invention as described hereinbelow.

Reference is now made to the accompanying drawings wherein like reference numerals and letters designate like parts and wherein.

Figures 3, 7:
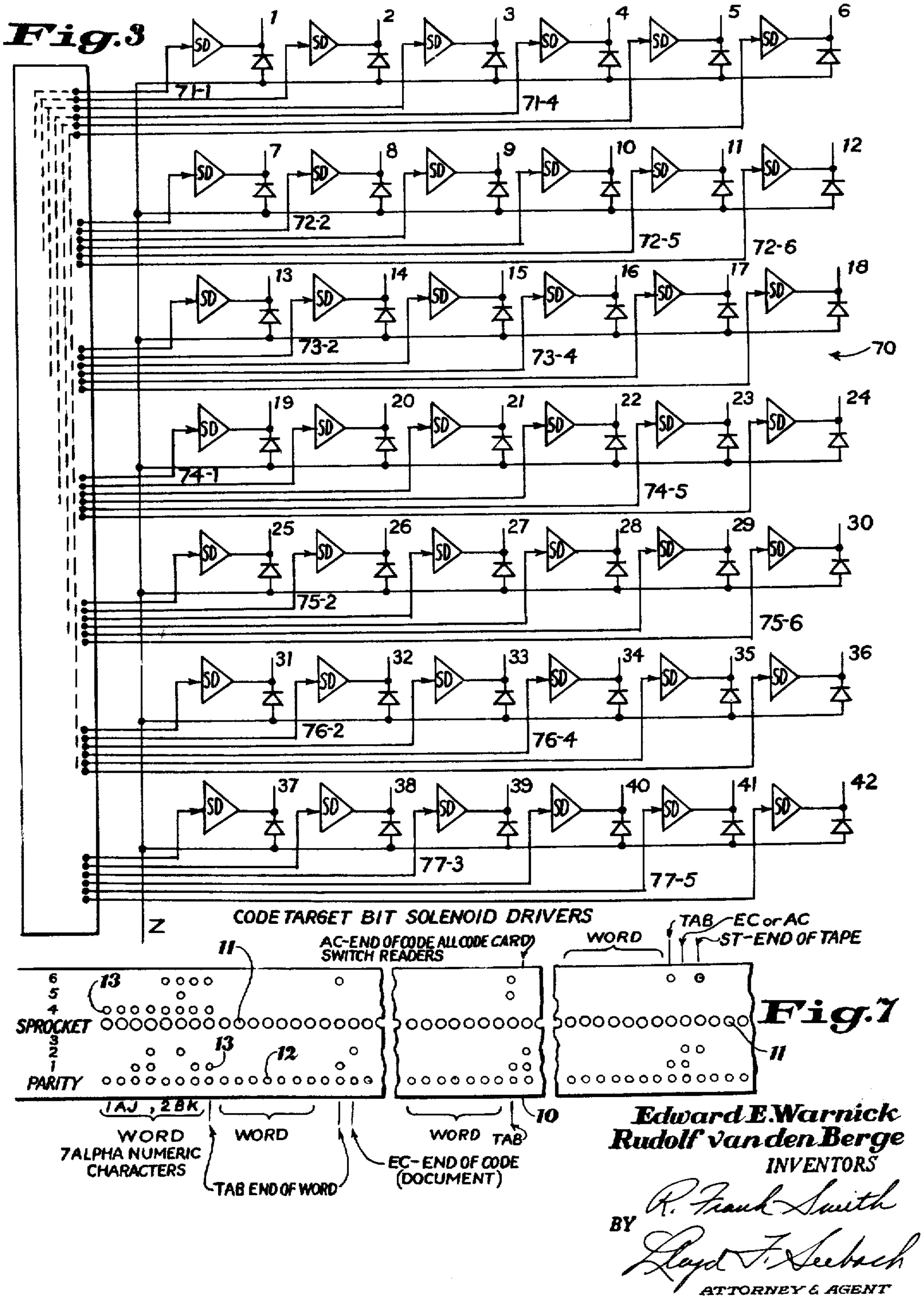
FIG. 3 is a schematic electrical diagram showing the drivers for the solenoids in the recording device.
FIG. 7 is a plan view of the tape showing the format and relation of the characters, words and control characters encoded on the tape.

Before proceeding with a detailed description of the circuitry, it is deemed advisable to describe the tape format shown in FIG. 7. The tape 10 is provided with a group of equally spaced apertures 11 which engage a sprocket in the tape reader for advancing the tape continuously past the sensing means. The tape is provided with columns of perforations designating encoded characters in accordance with the table set forth hereinbelow. As shown in FIG. 7, each column of code, which extends transversely of the tape, comprises a parity code perforation 12 and a group of perforations 13 arranged on one or both sides of the sprocket perforations in accordance with the character designated by such code. Each column, therefore, is representative of a character and seven such columns are representative of a word. Each word is separated by a code designation TAB which designates the end of a word. Successive words will therefore be separated from one another by the TAB designation. In order to designate the end of code for a particular document, a column of code designated EC follows the TAB designation. If a record is to comprise all code, then the end of code is designated by the character AC which follows the TAB designation. For the end of tape, three columns of code are utilized—that is, the TAB designation, which indicates the end of the last word, and EC and AC designation, which designates the end of code, and an ST designation which signifies the end of the tape.

The system used herein to encode the various characters is represented digitally as a 1 or a 0, the 1 being representative of a perforation in the tape and a 0 being representative of no perforation. Since at least 36 different binary bit combinations must be available—that is, 10 for the numerics and 26 for the alphabet, it is necessary to use combinations of six bits to obtain the requisite number. Each binary character has been divided into a zone and a field, the zone consisting of the two most significant bits while the field is comprised of the four remaining or least significant bits. Thus the binary character 010100 would be broken down into its zone (01) and its field (0100). This relationship is shown in the table hereinbelow in which the field for the least significant bits, which are common to the numerical and alphabetical characters, are in a column to the right and the zone combinations are arranged at the top of the page, one over each column of characters. The zone combination over a column represents all the characters in the column. Obviously, to select any particular character it is necessary to combine the proper zone and field.

| Zone | | | | Field |
|---|---|---|---|---|
| Binary bits 1 and 2 | | | | Binary bits 3-6 |
| 00 | 01 | 10 | 11 | |
| Blank | EC | CS | AC | 0000 |
| BS | ST | TAB | CR | 0001 |
| ∅ | & | / | . | 0011 |
| 1 | A | J | , | 0100 |
| 2 | B | K | S | 0101 |
| 3 | C | L | T | 0110 |
| 4 | D | M | U | 0111 |
| 5 | E | N | V | 1000 |
| 6 | F | O | W | 1001 |
| 7 | G | P | X | 1010 |
| 8 | H | Q | Y | 1011 |
| 9 | I | R | Z | 1100 |
| UC | LC | Type Space | Tape Delete | 1111 |

A tape of the type disclosed in FIG. 7 can be produced by a tape typewriter of the type which is fully disclosed in U.S. Patent Nos. 2,700,445, 2,700,446, and 2,700,447, issued to E. O. Boldgett. A tape reader is associated with such a tape typewriter and provides signals in accordance with the perforations in the tape. The type of tape reader associated with such a typewriter is usually of a mechanical sensing type, although the tape may also be sensed by a high-speed optical sensing device. Such tape readers, either of the mechanical or optical type, can be used as a source of input to the circuitry to be described. Where more than one of such tape readers are used, such as disclosed diagrammatically in FIG. 6, the tape readers can be of the mechanical type or one can be a mechanical type and the other a high-speed optical scanning type. Irrespective of the types used, the inputs to the circuitry comprises eight bits, six bits being derived from the code, a seventh bit being derived from the parity code, and the eighth bit being a signal derived from the sprocket perforation for a timing pulse. The logic accepts only positive going signals and the input trigger level is set at +4.5 to +5.5 volts D.C., a signal which is more positive than this being recognized as a bit "1" or a perforation in the tape and a signal more negative than this being recognized as a bit "0" or the absence of a perforation in the tape.

The tape contains word groups of seven alpha-numerics followed by the control character TAB. Following the last TAB of a word group control characters AC or EC are used to designate the end of code for a document. The control character ST follows the characters AC or EC to designate the end of the tape. Control characters TAB, AC, EC, or ST are the only control characters recognized by the circuitry as acceptable commands and all other control characters are ignored. TAB is used to signify the end of a word and initiate the word transfer from the circuitry to the bit solenoids of the recording device. AC is used to identify the end of the word group or to identify reader switching and is used by the relay logic to automatically read and record or switch readers. It should be pointed out at this point that the reader used as an input source may be switched at any time during any part of a word cycle. The switching operation is therefore not limited to switching only at the end of a tape or the end of a document. In this way information on one tape can be interlaced with that on another tape. EC and ST are used to identify the end of a word group and are used to stop reading and recording.

Figure 2:
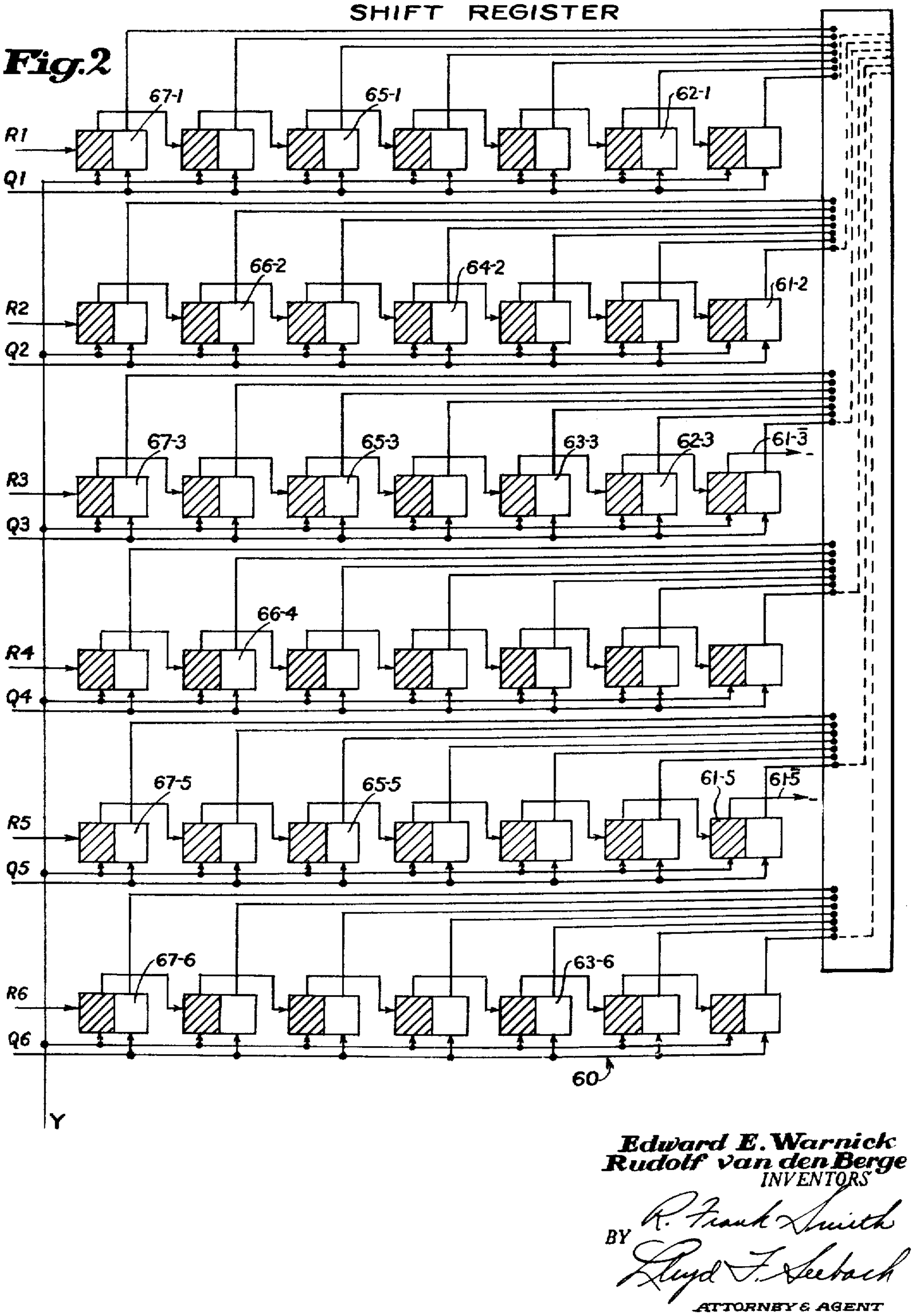
FIG. 2 is a schematic electrical diagram showing the shift register in which each character is serially stored until a word has been entered therein.

In addition to the 40 assigned alpha-numerics that can enter the shift register 60, see FIG. 2 and ultimately appear as outputs from the code target solenoid drivers 70, see FIG. 3, it is possible for seven unassigned code combinations to also enter the register. The seven unassigned code combinations can be prevented from entering the register only by prior-to-use checking of the input tape and their deletion at that time. There are no tape-checking features employed in the circuitry and tape errors will be transferred to the register. It is important, therefore, that the tape contain only the proper number of characters per word with correct placement of the control characters.

The eight possible input signals which are derived from the tape 10 are applied to shaping circuits which consist of Schmitt trigger units 20–1–8 which act as buffers between the tape reader and the assertion-negation flip-flops 21. The Schmitt triggers 20 are commercially available packages and are used to insure that the circuits are independent of the input source. Six triggers 20–1–6 are employed to shape the code bits, one trigger 20–7 to shape the parity bit and one trigger 20–8 to shape the sprocket or timing pulse. The output signals from the triggers associated with the code bits are applied to the assertion-negation flip-flops 21–1–6. The output from the Schmitt trigger 20–7 associated with the parity bit is applied to the parity bit transfer gate 40. The output from the Schmitt trigger 20–8 associated with the sprocket pulse is applied to the reader switching flip-flop 27 and to the multivibrator 28 in the character shift and read circuit.

The assertion-negation flip-flops 21–1–6 are used to obtain the digital "1" and the complement "0." The flip-flops are set by the Schmitt trigger output signals and six such flip-flops are utilized, one for each code bit. The flip-flops are reset by a pulse D which is derived in a manner to be described hereinafter after each character (six code bits) has been shifted into the register 60. Emitter followers 22–1–6 act as buffers between the negation output and the following circuitry.

Figure 1:
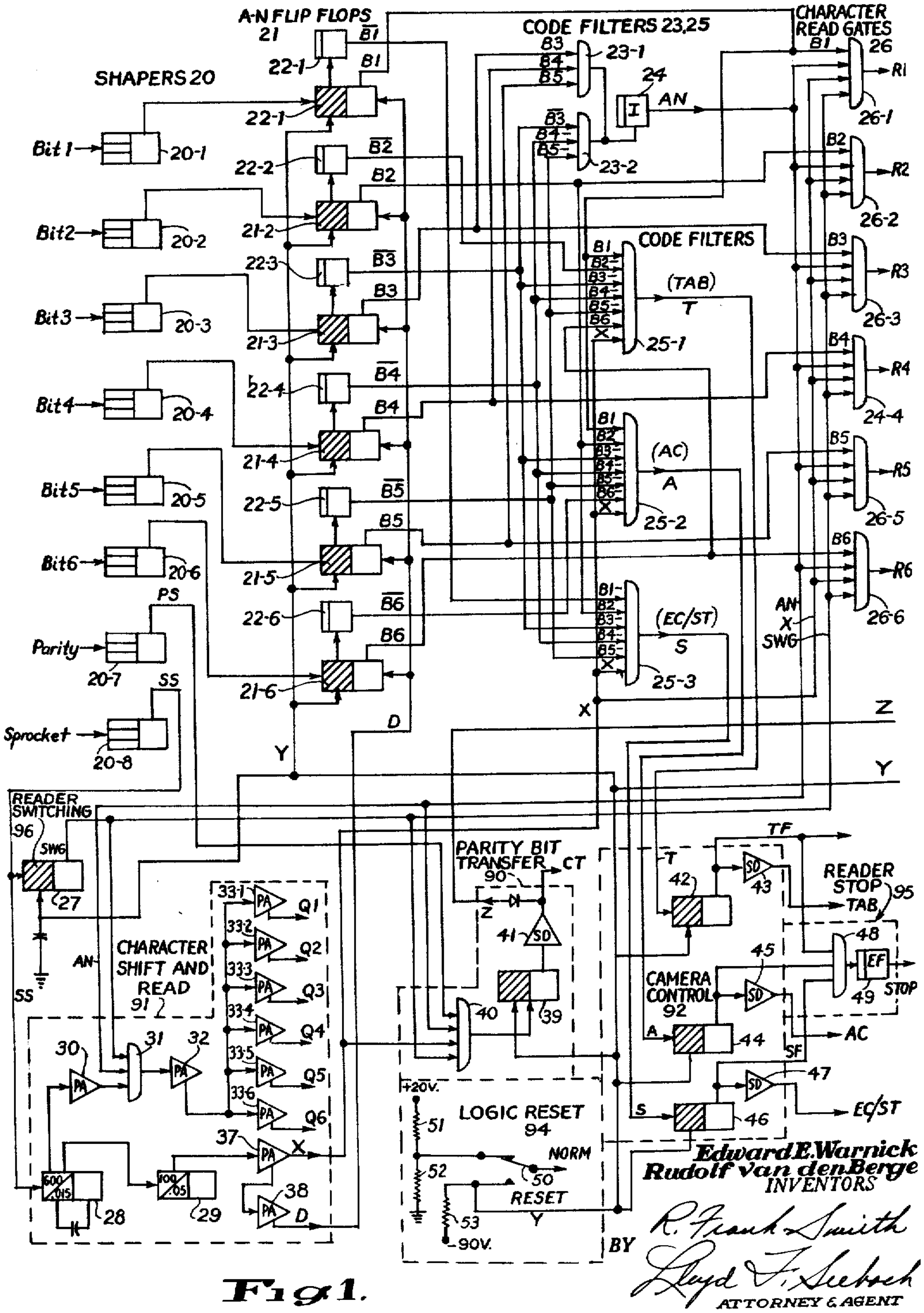
FIG. 1 is a schematic electrical diagram showing the circuit responsive to the signals derived from the information-bearing medium.

There are four code filters which provide output signals from the following code combinations: TAB 25–1, AC 25–2, EC/ST 25–3, and control code 23–1–2. The control code filter 23–1–2 is a two-circuit, three-leg diode gate connected as a two-circuit (OR) gate, see upper portion of FIG. 1. The output of the filter is inverted through an inverter-amplifier 24. The output from the inverter-amplifier, designated as AN, is applied to each of the character read gates 26–1–6 as well as to the parity bit transfer gate 40 and the character shift and read gate 31. This signal is negative going and serves as an inhibiting pulse when the control code filter signal is present. The TAB 25–1 and AC 25–2 code filters each employ one circuit, 7-leg diode gate. These code filters are non-coupled, that is, they are separate filters. One filter 25–3 is provided for the code combinations of EC and/or ST which is a one circuit, 6-leg diode gate. The control characters TAB and AC are filtered on the basis of code bits 1 through 6 and a read pulse X to be described hereinafter is applied to each filter to obtain bit coincidence. The filter outputs are coupled to the camera control circuit 92. On the other hand, the control characters EC and ST are filtered on the basis of code bits 1 through 5, and the two characters are treated as identities. The read pulse X provides bit coincidence and the output is also coupled to the camera control circuit 92.

To prevent control characters from entering the register 60, all control codes are filtered on the basis of code bits 3, 4 and 5. If the code bits are the same, that is, all bits "1" or all bits "0," the character is termed a control character. The filter is connected to the assertion-negation flip-flops 21–3–5 and to emitter followers 22–3–5 so as to provide a signal to the inverter-amplifier 24 when a control character appears. As stated hereinbefore, the inverter-amplifier 24 provides an inhibiting pulse AN, which is negative going, only when the control code filter signal is present.

The character read gates 26–1–6 couple the shaped character code bits to the shift register 60 via R1–R6. The gates consist of three two-circuit 4-leg diode gates connected in the "AND" sense. One circuit is used for each code bit and the inputs to each "AND" gate consist of the assertion-negation flip-flop "1" output, the control code inhibiting pulse AN, the reader switching output SWG and read pulse X. Only alpha-numeric character code bits can enter the register through the gates 26 due to the inhibiting action of the control code pulse AN which, as described above, is negative going.

The shift register 60 is the word storage memory and consists of 42 shift flip-flops 61–1–7 through 66–1–7, one for each word bit. The register is arranged in six rows and each row contains seven cascaded flip-flops. A character read gate 26 is connected to its proper flip-flop row and the shift register pulsing sequence is as follows: Shift and then read-in. The pulsing sequence is followed for each character until all seven characters of a word are in the memory. The register 60 is reset before each word is placed in storage and since the shift pulses are generated by the tape character sprocket pulse SS, the first character of any word will be in the first character flip-flops 61–1–6 of the register only when seven alpha-numeric characters are present on the input tape.

The parity bit transfer circuit 90 converts tape character parity to word parity and correct word parity is assured if seven characters are placed in the register 60. The circuit consists of a one-circuit, 4-leg diode gate 40, a flip-flop 39 and a solenoid driver 41. The circuit has four inputs to the diode gate 40, one input coming from the parity Schmitt trigger 20–7 and the other inputs being derived from the control code inhibiting pulse AN, the reader switching output SWG and read pulse X. Only alpha-numeric character parity information will pass the gate which is coupled to the binary flip-flop 39. The flip-flop is reset prior to word read-in and thus accumulates the word parity. The flip-flop output is coupled to solenoid driver 41 which provides a signal CT to the parity bit solenoid in the code target and a signal Z which is applied simultaneously to the solenoid drivers 70 for the code target bits.

The character shift and read circuit 91 is the basic timing circuit for the logic. Timing pulses are generated by shaping and delaying the tape sprocket pulses SS. The circuit consists of two cascaded fixed time-delay multivibrators 28 and 29, ten pulse amplifiers 30, 32, 33–1–6, 37 and 38, and a one-circuit, 4-leg diode gate 31. The tape sprocket pulse, as derived from its associated Schmitt trigger circuit 20–8, is coupled to the first multivibrator 28. The pulse is delayed for a period determined by the tape reader being used and the multivibrator output is coupled to pulse amplifier 30 and to the second multivibrator 29. The pulse amplifier 30 is connected to one leg of the diode gate 31 where it is gated with the control code inhibiting pulse AN and the reader switching output SWG. The absence of a control code pulse AN produces a gate output signal which is coupled to pulse amplifier 32 which serves as a driver for six additional pulse amplifiers 33–1–6 which, in turn, provide the register shift pulses Q1–6. The register 60 will be shifted when alpha-numeric characters are read into the logic. The second multivibrator 29 provides an additional delay after the shift pulse and its output is coupled to pulse amplifier 37 whose normal output provides the read pulse X and whose delayed output is coupled to another pulse amplifier 38 to provide the signal D which resets the assertion-negation flip-flops 21–1–6.

The camera control circuit 92 provides driving power for the recording device relays associated with the TAB, AC, EC, and ST control characters. The circuit consists of three flip-flops 42, 44 and 46 and three solenoid drivers 43, 45 and 47, each shift flip-flop being connected to its proper code filter and being set by a pulse T, A and S from the respective filter. The shift flip-flops are coupled to solenoid drivers which actuate relays in the camera relay logic.

The code target bit solenoid drivers 70 couple the shift register bit signals to the solenoids of the recording device. The circuit consists of 42 solenoid drivers 71–1–6 through 77–1–6 and each driver is coupled to a shift flip-flop in the register 60. The drivers are conditioned simultaneously by the Z pulse which is derived from the parity bit transfer circuit and this pulse insures that seven characters have been entered and stored in the register for parallel release through the drivers to the solenoids.

If a tape is provided with a numeric word, the first character in the word is a tag character of a particular code combination. If it is assumed that such a tag is represented by the character S, then the code in the first column of a numeric word would be 110101. When such a code designation is encountered as the first character of a word, the S tag gate circuit 93 provides the enabling pulse to the decode drivers for display of the S-tag numerics. The circuit, see FIGS. 4 and 5, consists of three emitter followers 54, 55 and 57, a one-circuit, 7-leg diode gate 56 and two shift flip-flops 58 and 59. The diode gate 56 is connected to the most significant character (tag shift register flip-flops). Two emitter followers are used to couple the complement bit "0" inputs and thereby prevent loading of the register. Another input to the gate is the TAB shift flip-flop pulse TF which initiates read-out. The S tag gate output pulse is coupled to emitter follower 57 which drives the two shift flip-flops 58 and 59. The shift flip-flops provide proper driving level for the decode solenoid driver gates 80.

The S tag decode solenoid drivers 81 energize the decode relays 82 of the S-tag display circuit. This circuit consists of 24 solenoid drivers 81–1–24 and eight three-circuit, 2-leg diode gates 80–1–24. Each code bit circuit contains a one-circuit, 2-leg diode gate and a solenoid driver. Numeric decoding is based upon code bits 3 through 6 and since bits 1 and 2 are the same for all numerics, these can be ignored. One leg of each gate is connected to a shift flip-flop of the register 60 to obtain 24 decoding bits. The other legs in the gates are connected to the S tag circuit shift flip-flop to obtain the read-out gating pulse SG. Upon recognition of a S tag, the appropriate decode solenoid drivers are energized. Four drivers are used for each numeric character, thereby pemitting a display of six numerals. The respective relays 82 are then energized and by means of the matrix 83 formed by the relay contacts, a circuit is provided to indicate the numeric on a nixie display register, indicated generally by numeral 85 in FIG. 5.

The logic reset circuit 94 provides the operating and reset bias potentials to the circuitry logic. The circuit drives all flip-flops, and three resistors 51, 52 and 53 and a manual C-contact switch 50 comprise the circuit. Two resistors 51 and 52 are connected in divider fashion to provide a +5 volt D.C. normal operating bias to the flip-flops. A current-limiting resistor 53 connected to −90 volts D.C. provides the resetting current for all flip-flops. The switch is connected to provide +5 volts D.C. in the off position and provides local resetting. In normal camera operation, a remote C-contact relay provides the resetting. The relay contacts are connected so that the normally closed contact 50 is coupled to the local reset switch output and the normally open contact is coupled to the current-limiting resistor. The relay contact output controls the reset line Y and a minimum of 1 millisecond is required for resetting which occurs prior to word read-in. Reset also controls the on time of all solenoid drivers.

The reader stop circuit 95 provides a stop pulse for the reader and this circuit consists of a three-leg OR gate 48 and an emitter follower 49. The three inputs to the gate consist of the three shift flip-flop signals TF, AF and SF derived from flip-flops 42, 44 and 46, respectively. A positive signal on any leg will provide a pulse output which will stop the reader.

The reader switching circuit 96 provides the disabling gate pulse SWG during reader switching to preserve the existing memory storage. The circuit consists of shift flip-flop 27 which is set by the sprocket pulses SS and reset by pulse Y. The output is connected to one leg of each character read gate 26, the parity bit gate 40 and the character shift and read gate 31. This circuit is used primarily by the camera for the reader switching operation. To switch readers, the following sequence occurs: When the first reader stops and the switching command is given, the reader's switching flip-flop 27 is held in reset by Y. This disables the gates mentioned previously and prevents any read-in or shifting of the register 60 and read-in to the parity flip-flop 39. Next, the assertion-negation flip-flops 21 and camera control flip-flops 42, 44 and 46 are held in reset by Y. Following this, the reader input leads will be switched through actuation of switch 97, see FIG. 6. The logic will be unaffected by any transients due to swtiching or existing states of the reader signals. Finally, the reset line Y is returned to the normal operating bias. When the second reader starts to read, the first sprocket pulse SS will set the reader switching flip-flop 27 which will enable all the gates and in this manner reading is then continued from the second reader. As mentioned hereinabove, this switching operation can occur at any time during a word cycle, at the end of a word cycle, or at the end of a tape.

If it is assumed that the tape 10 shown in FIG. 7 has been loaded into one of the readers and is being moved through the sensing station of such reader and also that the various circuits and flip-flops as well as the controls have been set to their normal operating position, then the first column of code to be encountered by the sensing means will be that designating the numeral 1. The single perforation in this column provides a signal which is applied to the shaper circuit 20–4. At the same time, a signal is derived from the corresponding sprocket perforation 11 and from the corresponding parity perforation 12, these signals being applied, respectively, to the shaping circuits 20–8 and 20–7. The output from shaper circuit 20–8 is applied to the reader switching flip-flop 27 and to the multivibrator 28. The output from the parity shaping circuit 20–7 is applied to one of the legs of the parity bit gate 40. The reader switching flip-flop 27 provides a continuous output pulse which is applied to the character shift and read gate 31 to the parity bit transfer gate 40 and to each of the character read gates 26–1–6. This pulse SWG is utilized to condition each of the foregoing mentioned gates. The output from the shaping circuit 20–4 is applied to the AN flip-flop 20–4 and its output is applied to the character read gate 26–4. While this output is also applied to the code filter 23–1, there is no sensing of a control code and, as a result, no signal is derived from the filter 23–1. The sprocket pulse which is applied to multivibrator 28 results in an output to the amplifier 30 and to the multivibrator 29, this output being delayed as described above. The amplified signal from the power amplifier 30 is applied to the character shift and read gate 31 and since this gate is conditioned by the pulse SWG and no inhibiting pulse AN is present (no control character), an output is obtained which is amplified by the power amplifier 32 and applied to the group of power amplifiers 33–1–36. The output from these power amplifiers Q1–Q6 are transmitted to their respective banks of flip-flops 61–1–7 through 66–1–7 in the shift register. However, since no characters are stored in register 60 at this time, this first group of shift pulses has no effect on the register.

The signal derived from multivibrator 28 and further delayed by the multivibrator 29 is applied to the power amplifier 33 to provide an output pulse X which is applied to the parity transfer gate 40, to the code filters 25–1–3 and to the character read gates 26–1–6. Since the character read is not a control character, the application of the X pulse to the code filters 25–1–3 and to the parity bit transfer gate 40 has no effect. However, the application of the X pulse to the character read gates 26–1–6 arrives in coincidence with the signals from the AN flip-flops 21–1 through 21–6. In this particular instance, only a single signal is being applied to character read gate 26–4 and as a result, an output is obtained from 26–4 (R4) which is applied to the flip-flop 67–4 in the shift register. The signal applied to power amplifier 37 besides providing the pulse X is also applied to the power amplifier 38 to provide an output pulse D which is, in turn, applied to the AN flip-flops 21–1–6 to reset said flip-flops for read-in of the next character. Since the X pulse is derived before the D pulse, the shifting of the register and the read-in to the register occur before the D pulse so that the order is shifting of register (Q1–6), read-in (X), and then reset (D) to be ready to accept the next character. Since the first character is not a control character, the parity bit transfer gate 40 has only three signals applied thereto and no output is derived to set the flip-flop 39.

With reference to FIG. 7, each of the columns of code will pass through the same circuits as described hereinabove. As a result, the shift register will be loaded with seven characters with the reading of the last character K of the word. This means that a character will be stored in each of the seven columns of the register and the last character (K) will be in the column comprising flip-flops 67–1–6 whereas the first character (1) will be in the column comprising flip-flops 61–1–6.

The next character to be sensed is the TAB character which designates the end of a word. The signal derived from this character will be applied to the shapers 20–1–6 and to 20–7 for the parity perforation and to 20–8 for the sprocket perforation. As described above, the parity signal from shaper 20–7 will be applied to gate 40 and the signal SS from the shaping circuit 20–8 will be applied to the reader switching flip-flop 27 and to the multivibrator 28 as with other characters. As described above, the TAB control character contains the bits 100001. As a result, signals will be applied to shaping circuits 20–1 and 20–6. The output from these two shaping circuits will be applied to AN flip-flops 21–1 and 21–6 as well as to the character read gates 26–1 and 26–6. However, since this is a control character and contains three zeros in the position 3–5, the outputs from shaping circuits 21–3–5 are applied to the code filter gate 23–1 to provide an output to the inverter amplifier 24 thereby providing the AN pulse to the character read gates 26–1–6, to the parity bit transfer gate 40 and to the character shift and read gate 31. Since the signal AN is a negative going signal, this inhibits the character read gates 26–1–6 and prevents any signal being derived therefrom. In the same way, this signal inhibits the character shift and read gate 31 so that the output from the multivibrator 28 through the power amplifier 30 is blocked and no signals Q1–6 can be applied to the shift register 60. The output from the multivibrator 28 is not inhibited, however, for application to the multivibrator 29 and to the power amplifiers 37 and 38 to provide the read-out signal X and the delayed reset signal D. The code filter 25–1 will provide an output only when a TAB character is sensed and since these conditions are fulfilled, an output is obtained therefrom with the application of the X signal to provide a T signal which is applied to the flip-flop 42 in the camera control circuit. At the same time, the X signal is applied to the parity bit transfer gate 40 to set the flip-flop 39 to provide an output through the solenoid driver 41 as a Z signal which is applied to the code target solenoid drivers 71–1–6 through 77–1–6. The Z signal provides a bias voltage on the solenoid driving circuits. This output signal as CT is also connected to the parity bit solenoid in the recording device disclosed in U.S. Patent 2,903,941. With the derivation of the signal T from the code filter 25–1, the switch 50 in the logic reset circuit is actuated to supply the reset signal Y to the AN flip-flops 21–1–6, to the reader switching flip-flop 27 and to the flip-flops 61–67 in the shift register 60. As described above, the Y pulse resets and holds the flip-flops 21–1–6 as well as the flip-flop 27 and upon application of this signal Y to the shift register, which occurs with the Z signal applied to the code target solenoid drivers 70, the stored characters are released in parallel to the recording device for setting up the seven characters of the word simultaneously. Switch 50 is then returned to its normally closed contact and the flip-flops in the various circuits are rset to their normally operating condition. When the T signal derived from the code filter 25–1 is applied to flip-flop 42 in the camera control circuit, an output TF is derived which is applied through solenoid driver 43 to a relay in the recording device for actuating the shutter mechanism for exposing the code pattern obtained by the actuation of the solenoids in the recording device, as disclosed in U.S. Patent 2,881,658. This same signal TF is also applied to the gate 48 and the output through emitter follower 49 is applied to the reader to stop it during the exposure cycle of the recording device. The reader is restarted at the recording device as described in the above-mentioned Patent 2,881,658. The signal TF is also applied to the tag gate 56, see FIG. 4.

The aforementioned procedure is followed for each word and for each TAB control character sensed at the end of each word. When an EC control character which indicates the end of code for a document or an ST character, which indicates the end of the tape, follow a TAB character, then the following conditions exist: Since either or both of the EC and ST control characters are always preceded by a TAB control character, the transfer of the characters stored in the register will have been shifted to the recording device and the register in all circuits will be in their normal operating condition, as described above. Since EC and/or ST are control characters, the output derived from the tape and applied to the shaping circuits 20 will be inhibited from entering the register by the code filter circuit 25–3. Since the character shift and read gate 31 and the parity bit transfer gate 40 have the necessary signals applied thereto for obtaining an output signal, these signals will have no effect inasmuch as no characters are stored in the shift register. The output signal S from the code filter gate 25–3 will be applied to the flip-flop 46 in the camera control circuit and the output therefrom will be applied through the solenoid driver 46 and the gate 48 to the camera or recording device. The signal SF to the gate 48 is used to insure stoppage of the reader in the event the TAB character had been inadvertently omitted from the tape. The signal from solenoid driver 47 is utilized to indicate to the operator at the recording device that the end of code has been reached and recording of documents (graphic) can now take place.

If the TAB control character is followed by an AC control character the following then occurs: As described above, the signal T derived from the TAB control character causes the tape reader to be stopped and the word to be recorded. The control character AC is handled in the same way as the TAB character through the shaping circuits 20, the flip-flops 21, and the code filter 25–2. The character read gates 26 being inhibited by the AN pulse derived from the inverter amplifier 24 as previously described. The signal A from the code filter 25–2 is applied to the flip-flop 44 and as a result of setting this flip-flop, a signal is derived from this flip-flop and applied to the solenoid driver 45 and the gate 48 to stop the tape reader. The output derived from the solenoid driver 45 is also applied to a relay associated with the readers and upon energization actuates the switch 97 for connecting the outputs from the other reader to the inputs of the shaping circuits 20 so as to now record from the second reader. If the AC character is encoded between any characters of a word, the AN signal inhibits entry of the character into the read gates 26 and also inhibits shifting and read-in to register 60. However, the signal A from gate 25–2 is applied to flip-flop 44 which causes the reader to be stopped and the inputs switched to the other reader. In this way, it is possible to derive the characters comprising a word from the tapes of both readers.

Figure 4:
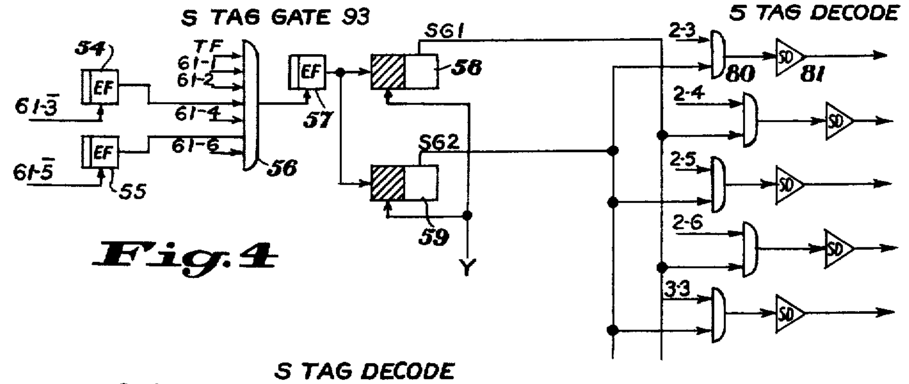
FIG. 4 is a schematic electrical diagram showing in particular the decoding of a numeric tag character.

As described above, a word may be preceded by a tag character and in this particular case a tag character S was assumed as the control tag. The S tag will therefore be designated by the bits 110101 which will be encoded on the tape in the first column of the word. The S tag filter 56 is coupled to the most significant end of the shift register 60, that is, the character flip-flops 61–1 through 61–6. The S tag numeric data will, therefore, be displayed only when the "S" character is in the tag positon (first character) of a word. The S tag is filtered on the basis of bits 1 through 6 and bits 3 and 5 (complement) require emitter followers to prevent loading of the shift register. With reference to FIGS. 2 and 4, it will be noted that the emitter follower 54 is connected to flip-flop 61–3 and to which the complement output $\overline{61-3}$ is connected. In a like manner, the emitter follower 55 is connected to the flip-flop $\overline{61-5}$ of the register. The outputs from the emitter followers 54 and 55 are applied to the S tag gate 56 and, in addition, the data bits 1, 2, 4 and 6 as derived from 61–1, 61–2, 61–4, and 61–6, as well as the TF signal derived from the TAB control character. This latter input is employed to prevent transfer of the character "S" until the shift register is completely loaded. If the TAB control character input were not used, "S" would be recognized on the tape-to-target shift pulse and the display indicators would not display the correct S tag. The output of the S tag filter 56 is a pulse applied to the emitter follower 57 whose output is applied to the flip-flops 58 and 59. The outputs from flip-flops 58 and 59, when set, are connected to a numeric gate driver circuit comprising 24 numeric gates 80 and the solenoid drivers 81 associated with each gate.

The numeric gate circuit consists of four two-legged AND gates for each character (six characters to be displayed) and the data bits 3 through 6 are used to decode the numeric characters. Since the data bits 1 and 2 are the same for all numeric characters, it is not necessary to use these bits for decoding. One leg of each of gates 80 is connected to the appropriate flip-flop of the shift register and the other leg of each gate is connected to the numeric gate driver 58 or 59. Upon receipt of the signal from the gate 56, which is recognition of the S tag, the output of the gates 80 will reflect the state of the shift register flip-flops 60.

Figures 5, 6:
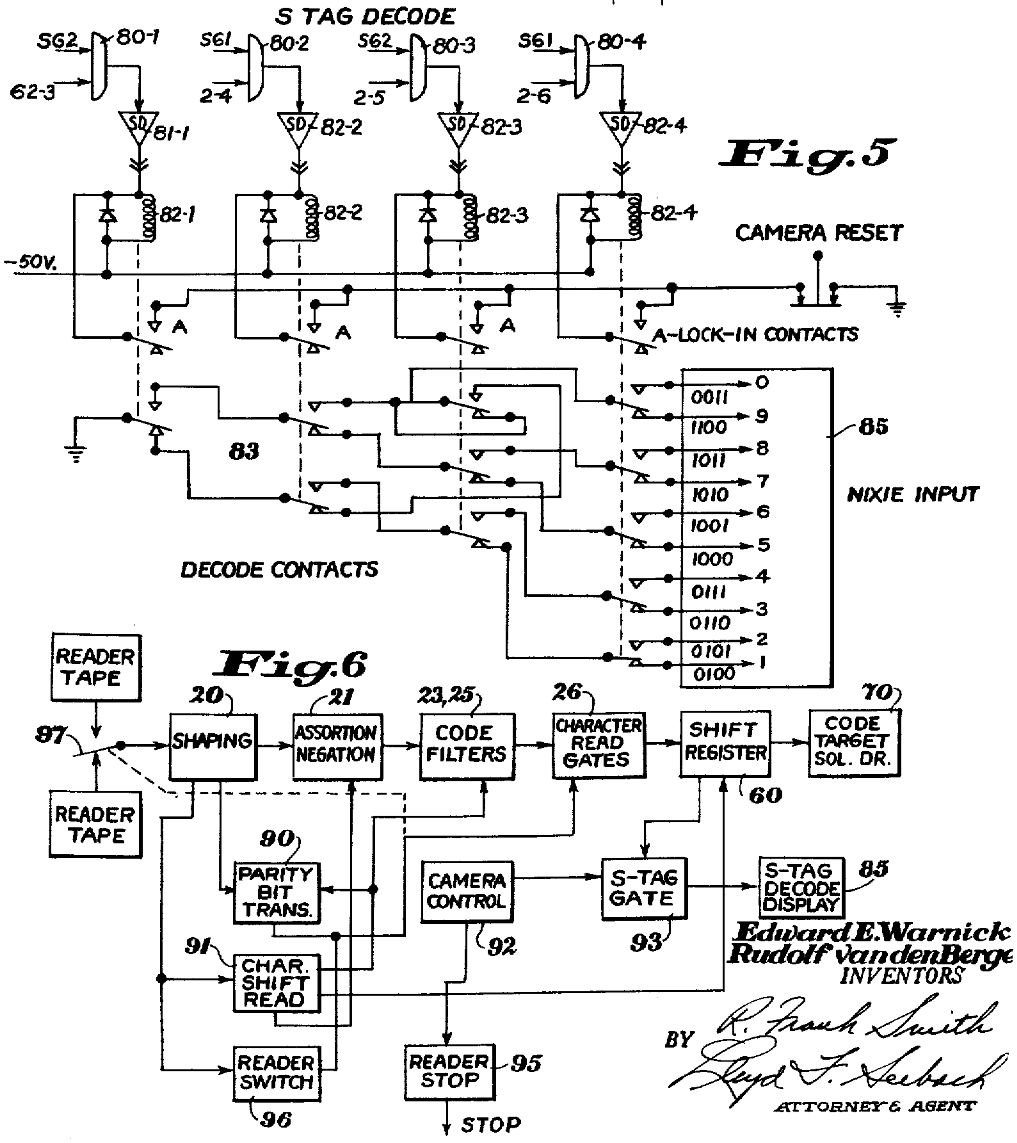
FIG. 5 is a schematic electrical diagram showing the decoding relay matrix associated with the numeric tag circuit shown in FIG. 4.
FIG. 6 is a block diagram showing the inter-relation of the circuitry shown in the previous figures.

The display indicator relay driver circuit consists of 24 solenoid drivers 81 which provide the power necessary to drive the display indicator relays 82. The relay drivers 81, as shown in FIG. 5, are for only a single character, five additional circuits being provided, and the display indicator 85 is connected to each of these circuits so as to display the complete numeric word. One contact of each relay will lock the relay until it is permitted to drop out when the recording device is reset. The remaining contacts are used in the form of a matrix 83 to decode the numeric bit data. When decoding occurs, a voltage (D.C. level) will be applied to the appropriate numeric indicator anode and thereby cause display of the decoded numeric character. The numeric indicator circuit consists of six numeric indicators used to display the S tag word, and this word will be displayed for an interval determined by the time between the TAB character recognition and the time that the recording device is reset.

While the invention has been shown and described with respect to a specific embodiment or particular application, it is to be understood that the circuitry described hereinabove can be utilized with respect to any information-bearing medium in which a group of parallel and successive groups of such signals are derived from the information-bearing medium and serially stored. Also, while the application is shown in conjunction with a binary code, it will be readily appreciated by those skilled in the art that any other type of code system can be used. Various changes in the circuitry may therefore be made by those skilled in the art; however, the invention is not to be limited to the disclosure and its application but is of a scope as defined by the appended claims.

Having now particularly described our invention, what we desire to secure by Letters Patent of the United States and what we claim is:

1. A device for receiving successive sets of input signals, each set being representative of a character, a timing mark and a parity mark which are derived in parallel from an information-bearing medium having groups of characters encoded in successive columns individual to a character with a timing mark and a parity mark arranged with respect to each of said columns, each group of characters being of equal number and being separated by at least one control character encoded between successive groups, the combination comprising means for reading said information-bearing medium and providing said sets of input signals, means individual to each signal in said sets of input signals for receiving said signals and providing simultaneous output signals of equal amplitude, means having a number of storage elements corresponding to the number of characters in a group for storing only the signals representative of a character, means responsive to each signal representative of one of said timing marks for providing a first output pulse delayed with respect to its respective set of input signals and a second and a third output pulse delayed with respect to said first output pulse, said first output pulse being applied to said storing means for shifting said signals stored therein from one storage element to the next and successive storage element, means responsive to said second delayed output pulse and said output pulsese from said receiving means for reading said output pulses into said storing means, means responsive to said third output pulse for resetting said receiving means to receive the next set of said input signals, means responsive to the output signal derived from said parity mark and associated with said control character and to the corresponding second output pulse for releasing in parallel said groups of signals in said storing means, and means responsive to only said set of input signals representative of said control character and to the corresponding second output pulse for providing a control pulse to initiate a device for recording the signals released from said storing means.

2. A device in accordance with claim 1 and including means responsive to said control character for inhibiting read-in of any signals to said storing means during the cycle of said control character.

3. A device in accordance with claim 1 and including means responsive to the signals released from said storing means and representative of a predetermined character corresponding to the first character in a group for initiating a device to visually display all of the characters in said group.

4. A device in accordance with claim 1 and including means responsive to only said output signals from said receiving means representative of said control character and to the corresponding second output pulse for providing an output pulse to initiate stoppage of said reading means.

5. A device for receiving successive sets of input signals, each set being representative of a character, a timing mark and a parity mark which are derived in parallel from one of a group of information-bearing mediums having groups of characters encoded in successive columns individual to a character with a timing mark and a parity mark arranged with respect to each of said columns, each group of characters being of equal number and being followed by a first control character, the end of any number of groups of characters being designated by said first control character followed by a second control character, a third control character arranged in any group of characters and at the end of a group of characters preceded by said first control character to designate derivation of said sets of input signals from another of said mediums, and the end of said information-bearing medium being designated by said first and second control characters followed by a fourth control character and by said first and third control characters followed by said fourth control character, the combination comprising means for reading each of the encoded information-bearing mediums, one of said reading means being normally connected to said device for providing said successive sets of input signals, means individual to each signal in said set of input signals for receiving said signals and providing simultaneous output signals of equal amplitude, means having a number of storage elements corresponding to the number of characters in a group for storing only the signals representative of a character, means responsive to each signal representative of one of said timing marks for providing a first output pulse delayed with respect to its respective set of input signals and a second and a third output pulse delayed with respect to said first output pulse, said first output pulse being applied to said storing means for shifting said signals stored therein from one storage element to the next and successive storage element, means responsive to said second delayed output pulse and said output pulses from said receiving means for reading said output pulses into the first of said storing elements, means responsive to said third output pulse for resetting said receiving means to receive the next set of said input signals, means responsive to the output signal derived from said parity mark associated with said first control character and to the corresponding second output pulse for releasing in parallel the signals in said storage elements, means responsive to only said set of input signals representative of said first control character and to the corresponding output pulse for providing a control pulse to initiate a device for recording said signals released from said storage elements, and means responsive to any one of said control characters for inhibiting read-in of any signals to said storing means during the cycle of any one of said control characters and for stopping said reading means from which said sets of input signals are being received.

6. A device in accordance with claim 5 including means responsive to only the output signals from said receiving means representative of said second control character and to said corresponding second output pulse to provide an output signal indicative of the end of code of a number of groups of characters.

7. A device in accordance with claim 5 including means responsive to only said output signals from said receiving means representative of said third control character and to the corresponding second output pulse to provide an output pulse for initiating derivation of said sets of input signals from another of said reading means.

8. A device in accordance with claim 5 including means responsive to only said output signals from said receiving means representative of any one of said control characters and to said corresponding second output pulse for providing an output pulse to initiate stoppage of the reading means from which said sets of input signals are being received.

9. A device in accordance with claim 5 including means responsive to the signals released from said storing means and representative of a predetermined character corresponding to the first character in the stored group for initiating a device to visually display all of the characters in said group.

10. A device in accordance with claim 5 including means responsive to only said output signals from said receiving means representative of said second control character and said third control character and to said corresponding second output pulse to provide an output pulse for stopping said reading means from which said sets of input signals are being received and for initiating derivation of said sets of input signals from another of said reading means.

References Cited in the file of this patent

UNITED STATES PATENTS

| | | |
|---|---|---|
| 2,700,155 | Clayden | Jan. 18, 1955 |
| 2,813,259 | Burkhart | Nov. 12, 1957 |
| 2,819,457 | Hamilton | Jan. 7, 1958 |
| 2,850,234 | Bartelt et al. | Sept. 2, 1958 |
| 2,906,999 | Wright | Sept. 29, 1959 |
| 2,921,296 | Floros | Jan. 12, 1960 |
| 2,939,116 | Burns et al. | May 31, 1960 |